United States Patent
Edmonston et al.

(10) Patent No.: US 11,271,240 B2
(45) Date of Patent: Mar. 8, 2022

(54) FUEL CELL COLUMN CONTAINING ELECTRICALLY INSULATED FUEL MANIFOLD AND MANIFOLD JUMPER

(71) Applicant: BLOOM ENERGY CORPORATION, San Jose, CA (US)

(72) Inventors: David Edmonston, Soquel, CA (US); Michael Petrucha, Santa Clara, CA (US); Martin Perry, Mountain View, CA (US); Adrian Basharain, San Leandro, CA (US); Siddharth Patel, Menlo Park, CA (US); Paul Bhangu, Manteca, CA (US); Subhash Chander Deswal, Novi Mumbai (IN); Ian Russell, Sunnyvale, CA (US); Pawan Patil, Novi Mumbai (IN)

(73) Assignee: BLOOM ENERGY CORPORATION, San Jose, CA (US)

( * ) Notice: Subject to any disclaimer, the term of this patent is extended or adjusted under 35 U.S.C. 154(b) by 0 days.

(21) Appl. No.: 16/883,057

(22) Filed: May 26, 2020

(65) Prior Publication Data
US 2020/0381762 A1 Dec. 3, 2020

Related U.S. Application Data

(60) Provisional application No. 62/853,287, filed on May 28, 2019.

(51) Int. Cl.
| | |
|---|---|
| *H01M 8/2484* | (2016.01) |
| *H01M 8/04537* | (2016.01) |
| *H01M 8/247* | (2016.01) |
| *H01M 8/249* | (2016.01) |

(52) U.S. Cl.
CPC ..... *H01M 8/2484* (2016.02); *H01M 8/04619* (2013.01); *H01M 8/249* (2013.01)

(58) Field of Classification Search
CPC .................................................. H01M 8/2484
See application file for complete search history.

(56) References Cited

U.S. PATENT DOCUMENTS

| | | | |
|---|---|---|---|
| 5,549,983 A * | 8/1996 | Yamanis | H01M 8/2425 429/461 |
| 8,785,012 B2 | 7/2014 | Gottmann et al. | |
| 8,785,074 B2 | 7/2014 | Edmonston et al. | |
| 8,968,958 B2 | 3/2015 | Gottmann et al. | |
| 10,211,478 B2 * | 2/2019 | Armstrong | H01M 8/247 |
| 10,211,479 B2 | 2/2019 | Edmonston et al. | |
| 10,511,047 B2 | 12/2019 | Armstrong et al. | |
| 2007/0196704 A1 | 8/2007 | Valensa et al. | |
| 2011/0117466 A1 * | 5/2011 | Badding | H01M 8/04014 429/435 |
| 2014/0087286 A1 * | 3/2014 | Fisher | H01M 8/2484 429/471 |
| 2016/0226093 A1 | 8/2016 | Edmonston et al. | |
| 2017/0104233 A1 * | 4/2017 | Armstrong | H01M 8/021 |
| 2017/0222236 A1 | 8/2017 | Armstrong et al. | |

\* cited by examiner

*Primary Examiner* — Brian R Ohara
(74) *Attorney, Agent, or Firm* — The Marbury Law Group PLLC (57) ABSTRACT

A fuel cell device includes at least one fuel cell column containing first and second fuel cell stacks, a fuel manifold located between the first and second fuel cell stacks and configured to provide fuel to the first and second fuel cell stacks, and a dielectric material located to electrically isolate the first and second fuel cell stacks from the fuel manifold.

18 Claims, 7 Drawing Sheets

FIG. 1
PRIOR ART

Prior Art

Fig. 2

Prior Art

FUEL CELL COLUMN CONTAINING ELECTRICALLY INSULATED FUEL MANIFOLD AND MANIFOLD JUMPER

FIELD

The present invention is directed to a fuel cell column containing electrically insulated fuel manifold and manifold jumper.

BACKGROUND

Fuel cells are electrochemical devices which can convert energy stored in fuels to electrical energy with high efficiencies. High temperature fuel cells include solid oxide and molten carbonate fuel cells. These fuel cells may operate using hydrogen and/or hydrocarbon fuels. There are classes of fuel cells, such as the solid oxide reversible fuel cells, that also allow reversed operation, such that water or other oxidized fuel can be reduced to unoxidized fuel using electrical energy as an input.

In a high temperature fuel cell system, such as a solid oxide fuel cell (SOFC) system, an oxidizing flow is passed through the cathode side of the fuel cell while a fuel flow is passed through the anode side of the fuel cell. The oxidizing flow is typically air, while the fuel flow is typically a hydrogen-rich gas created by reforming a hydrocarbon fuel source. The fuel cell, operating at a typical temperature between 750° C. and 950° C., enables the transport of negatively charged oxygen ions from the cathode flow stream to the anode flow stream, where the ion combines with either free hydrogen or hydrogen in a hydrocarbon molecule to form water vapor and/or with carbon monoxide to form carbon dioxide. The excess electrons from the negatively charged ion are routed back to the cathode side of the fuel cell through an electrical circuit completed between anode and cathode, resulting in an electrical current flow through the circuit.

Fuel cell stacks may be either internally or externally manifolded for fuel and air. In internally manifolded stacks, the fuel and air is distributed to each cell using risers contained within the stack. In other words, the gas flows through openings or holes in the supporting layer of each fuel cell, such as the electrolyte layer, and gas separator of each cell. In externally manifolded stacks, the stack is open on the fuel and air inlet and outlet sides, and the fuel and air are introduced and collected independently of the stack hardware. For example, the inlet and outlet fuel and air flow in separate channels between the stack and the manifold housing in which the stack is located.

Fuel cell stacks are frequently built from a multiplicity of cells in the form of planar elements, tubes, or other geometries. Fuel and air has to be provided to the electrochemically active surface, which can be large. One component of a fuel cell stack is the so called gas flow separator (referred to as a gas flow separator plate in a planar stack) that separates the individual cells in the stack. The gas flow separator plate separates fuel, such as hydrogen or a hydrocarbon fuel, flowing to the fuel electrode (i.e., anode) of one cell in the stack from oxidant, such as air, flowing to the air electrode (i.e., cathode) of an adjacent cell in the stack. Frequently, the gas flow separator plate is also used as an interconnect which electrically connects the fuel electrode of one cell to the air electrode of the adjacent cell. In this case, the gas flow separator plate which functions as an interconnect is made of or contains an electrically conductive material.

SUMMARY

A fuel cell device includes at least one fuel cell column containing first and second fuel cell stacks, a fuel manifold located between the first and second fuel cell stacks and configured to provide fuel to the first and second fuel cell stacks, and a dielectric material located to electrically isolate the first and second fuel cell stacks from the fuel manifold.

DETAILED DESCRIPTION

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

Figure 1:
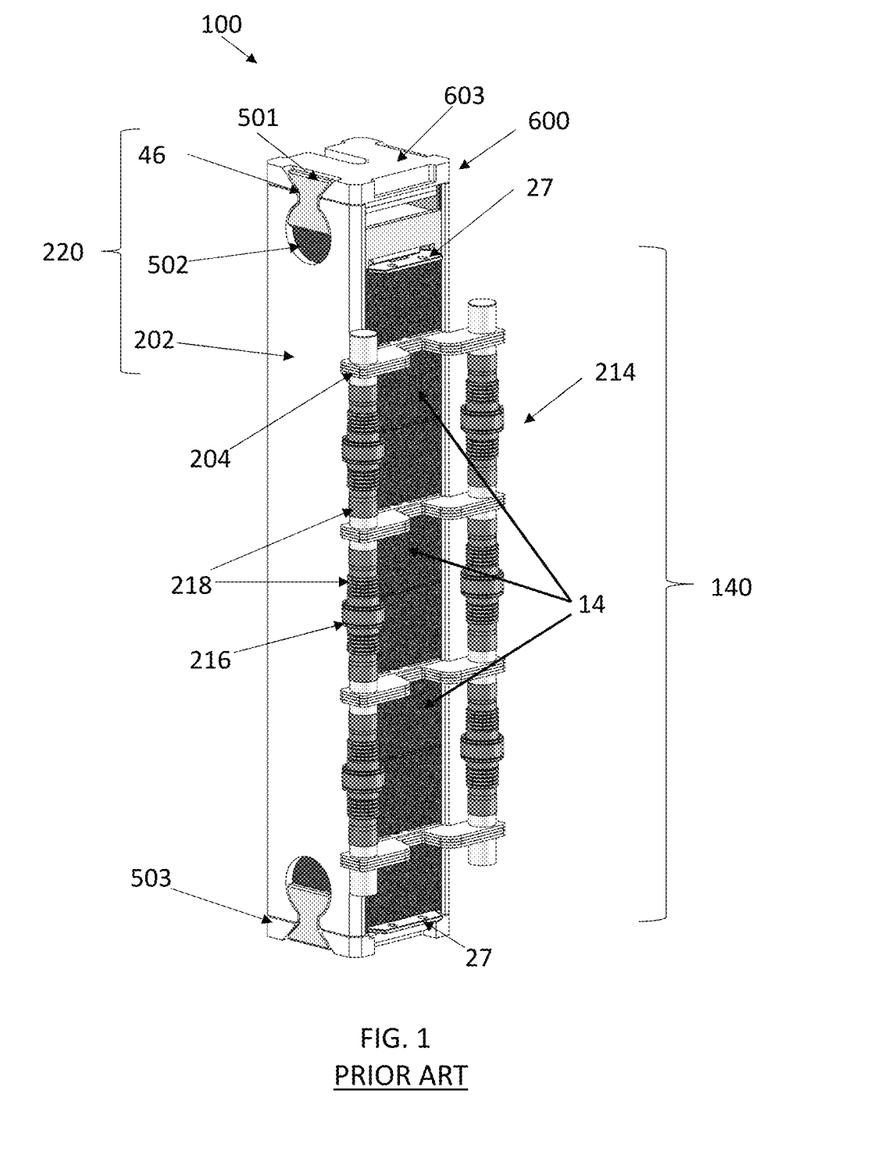
FIG. 1 is a three dimensional view of a prior art fuel cell stack assembly.

FIG. 1 illustrates a fuel cell stack assembly 100 according to various embodiments of the present disclosure. Referring to FIG. 1, the fuel cell stack assembly 100 includes a fuel cell stack column 140, side baffles 220 disposed on opposing sides of the column 140, a lower block 503, and a compression assembly 600 including an upper block 603. The column includes eight fuel cell stacks 14, fuel manifolds 204 disposed between the fuel cell stacks 14, and termination plates 27 disposed on opposing ends of the column 140. The fuel cell stacks 14 include a plurality of fuel cells stacked upon one another and separated by interconnects. A plurality of the fuel cell stack assemblies 100 may be attached to a base.

An exemplary fuel manifold 204 is described in the U.S. application Ser. No. 11/656,563, hereby incorporated by reference in its entirety. Any number of fuel manifolds 204 may be provided between adjacent end plates of adjacent fuel cells of the fuel cell stacks 14, as desired.

The side baffles 220 connect the upper block 603 of the compression assembly 600 and the lower block 503. The side baffles 220, the compression assembly 600, and the lower block 503 may be collectively referred to as a "stack housing". The stack housing is configured to apply a compressive load to the column 140. The configuration of the stack housing eliminates costly feed-throughs and resulting tie rod heat sinks and uses the same part (i.e., side baffle 220) for two purposes: to place the load on the stacks 14 and to direct the cathode feed flow stream (e.g., for a ring shaped arrangement of stacks, the cathode inlet stream, such as air or another oxidizer may be provided from a manifold outside the ring shaped arrangement through the stacks and the exit as a cathode exhaust stream to a manifold located inside the ring shaped arrangement). The side baffles 220 may also electrically isolate the fuel cell stacks 14 from metal components in the system. The load on the column 140 may be provided by the compression assembly 600, which is held in place by the side baffles 220 and the lower block 503. In other words, the compression assembly 600 may bias the stacks 14 of the column 140 towards the lower block 503.

The side baffles 220 may be plate-shaped rather than wedge-shaped and include baffle plates 202 and ceramic inserts 406 configured to connect the baffle plates 202 to the lower block 503 and the compression assembly 600. In particular, the baffle plates 202 include generally circular cutouts 502 in which the inserts 406 are disposed. The inserts 406 do not completely fill the cutouts 502. The inserts 406 are generally bowtie-shaped, but include flat edges 501 rather than fully rounded edges. Thus, an empty space remains in the respective cutouts 502 above or below the inserts 406.

Generally, the side baffles 220 are made from a high-temperature tolerant material, such as alumina or other suitable ceramic. In various embodiments, the side baffles 220 are made from a ceramic matrix composite (CMC). The CMC may include, for example, a matrix of aluminum oxide (e.g., alumina), zirconium oxide or silicon carbide. Other matrix materials may be selected as well. The fibers may be made from alumina, carbon, silicon carbide, or any other suitable material. The lower block 503 and the compression assembly 600 may also be made of the same or similar materials. The selection of particular materials for the compression housing is discussed in detail, below.

Any combination of the matrix and fibers may be used. Additionally, the fibers may be coated with an interfacial layer designed to improve the fatigue properties of the CMC. If desired, the CMC baffles may be made from a unitary piece of CMC material rather than from individual interlocking baffle plates. The CMC material may increase the baffle strength and creep resistance. If the baffles are made from alumina or an alumina fiber/alumina matrix CMC, then this material is a relatively good thermal conductor at typical SOFC operating temperatures (e.g., above 700° C.). If thermal decoupling of neighboring stacks or columns is desired, then the baffles can be made of a thermally insulating ceramic or CMC material.

Other elements of the compression housing, such as the lower block 503 and the compression assembly 600 may also be made of the same or similar materials. For example, the lower block 503 may comprise a ceramic material, such as alumina or CMC, which is separately attached (e.g., by the inserts, dovetails or other implements) to the side baffles 220 and to a system base. The use of the ceramic block material minimizes creation of heat sinks and eliminates the problem of linking the ceramic baffles to a metal base, which introduces thermal expansion interface problems. The selection of particular materials for the components of the compression housing is discussed in detail, below.

Fuel rails 214 (e.g. fuel inlet and outlet pipes or conduits) connect to fuel manifolds 204 located between the stacks 14 in the column 140. The fuel rails 214 include ceramic tubes 216 brazed to metal tubes 218. The metal tubes 218 may comprise compressible bellows tubes in one embodiment. The fuel cell rails 214 are used to deliver fuel to each pair of stacks 14 in a column 140 of fuel cell stacks via fuel cell manifolds 204. In these systems, the ceramic tubes 216 are located between adjacent fuel manifolds 204 to prevent shorting between adjacent stacks 14 in a column 140 of stacks 14. The ceramic tubes 216 are relatively expensive and difficult to braze to the metal tubes 218. The ceramic tubes 216 are also prone to cracking due to thermal stresses generated during thermal cycling of the fuel cell system.

Figure 2:
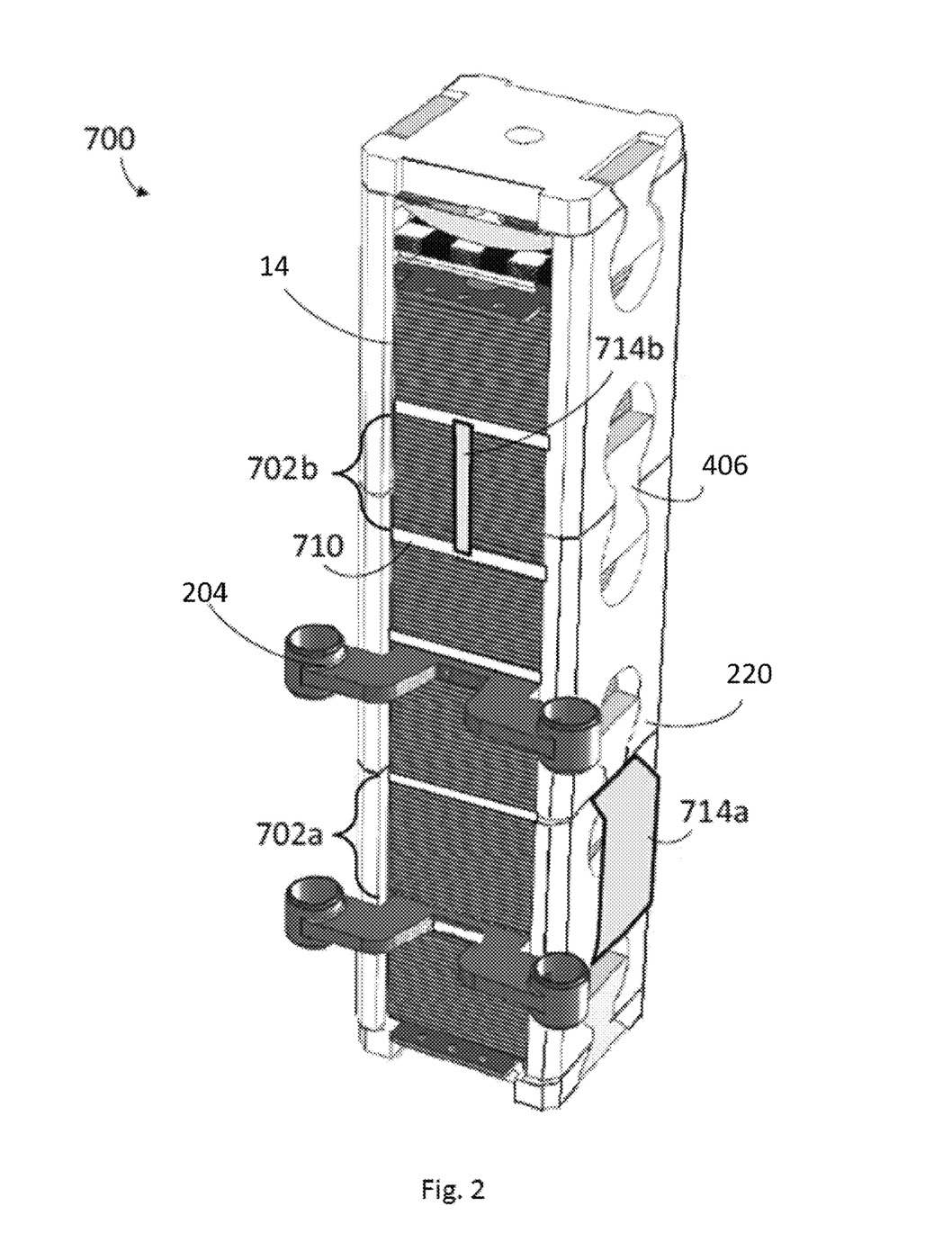
FIG. 2 is a three dimensional view of a fuel cell stack assembly with a prior art jumper configured to bypass a failed fuel cell stack.
Figure 3:
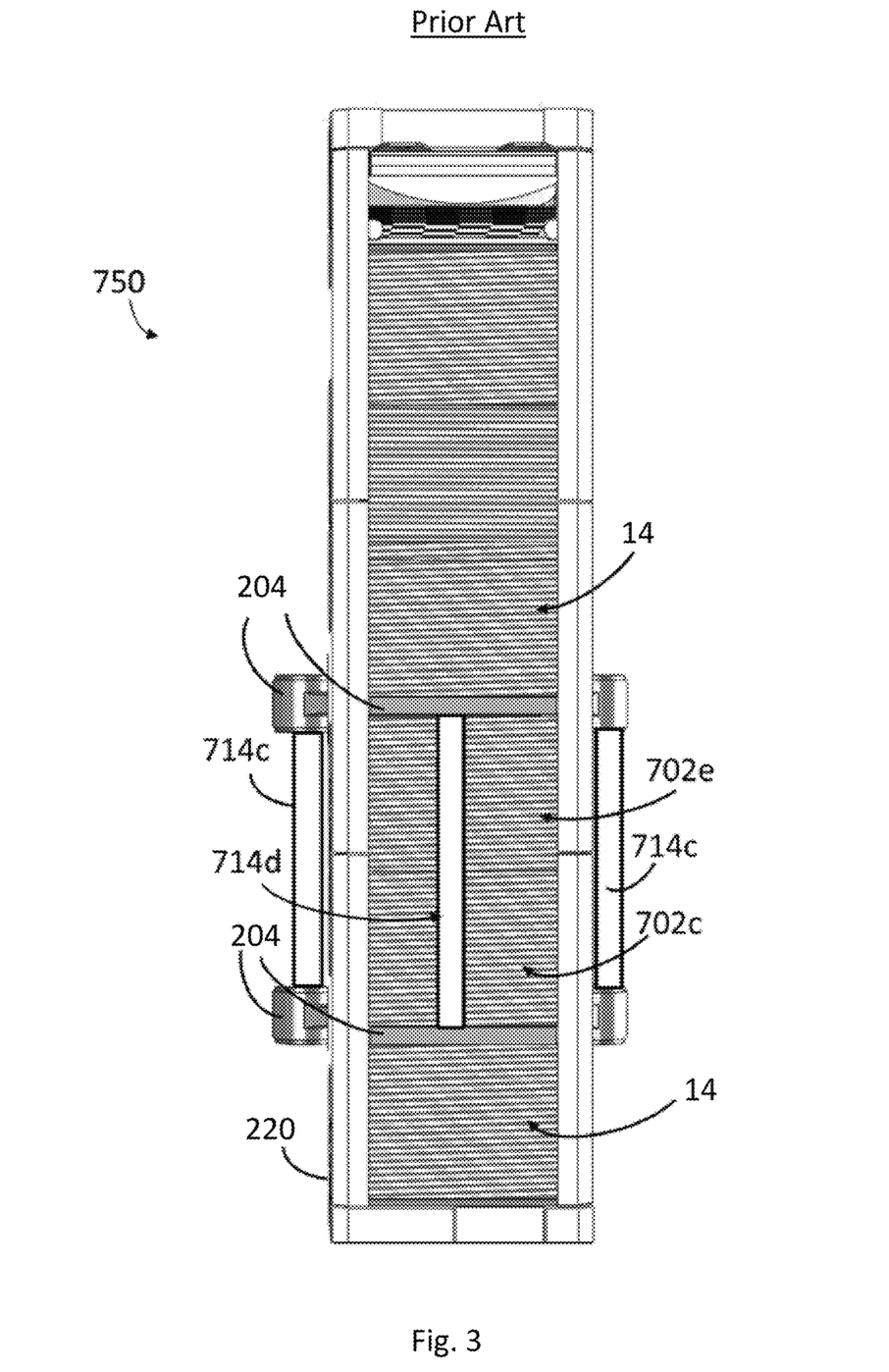
FIG. 3 is a front cross-sectional view of a fuel cell stack assembly with an alternative prior art jumper configured to bypass a failed fuel cell stack.

FIGS. 2 and 3 illustrate prior art fuel cell systems 700, 750 in which jumpers 714a-714d are used to electrically bypass failed fuel cell(s) or to bypass a failed stack 14 of fuel cells. Fuel cell bypass jumpers 714a-714d of the type illustrated in FIGS. 2 and 3 are described in U.S. patent application Ser. No. 14/029,178, published as U.S. Patent Publication No. 2014/0087286, now abandoned, hereby incorporated by reference in its entirety. Failed fuel cells greatly increase the electrical resistance of the fuel cell stack. The jumpers 714a-714d are operably attached to the interconnects or end plates 710 of good fuel cells on either side of the failed fuel cells in the stack 14 of fuel cells or failed stacks 702A, 702B. The jumpers 714a-714d are thus configured to provide a low resistance path between good fuel cells in a stack 14 of fuel cells by bypassing the failed fuel cells. However, jumpers 714a-714d bypass failed cells or stacks but do not bypass the fuel manifolds, as provided in embodiments of the present disclosure.

Figure 4:
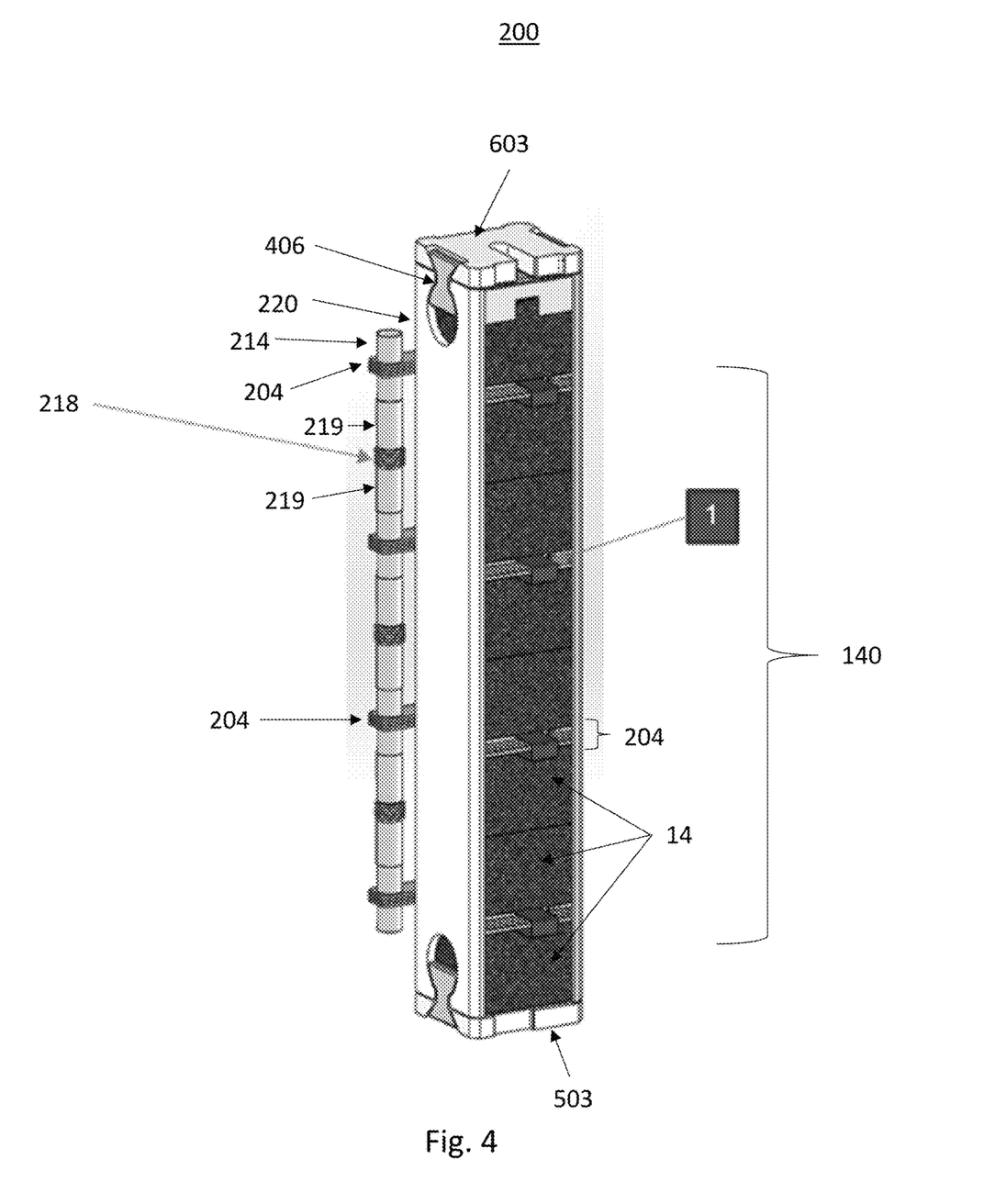
FIG. 4 is a three dimensional view of a fuel cell stack assembly with an electrically isolated fuel manifold according to an exemplary embodiment of the present disclosure.
Figure 5:
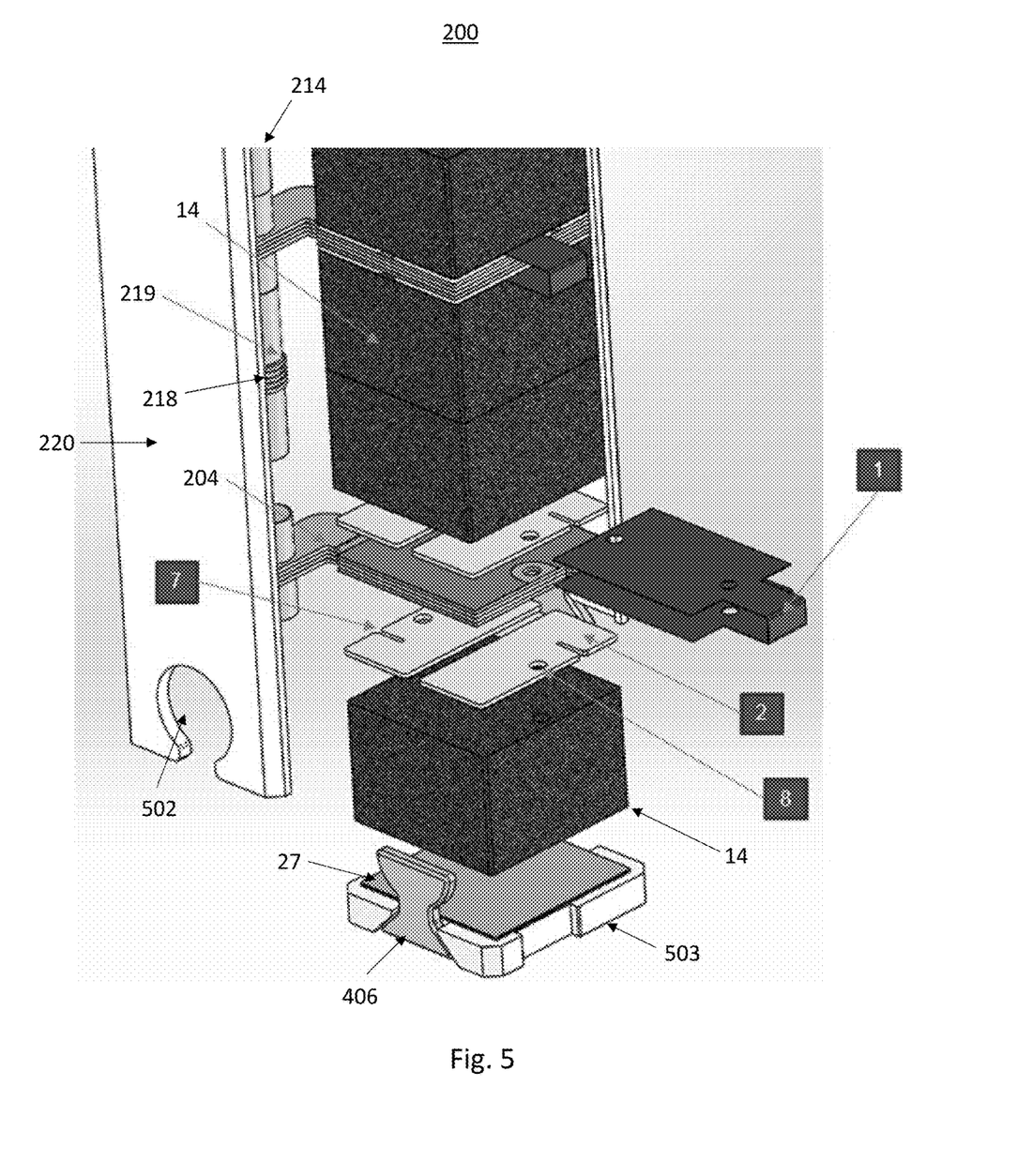
FIG. 5 is a three dimensional exploded view of the fuel cell stack assembly with an electrically isolated fuel manifold illustrated in FIG. 4.
Figures 6A, 6B:
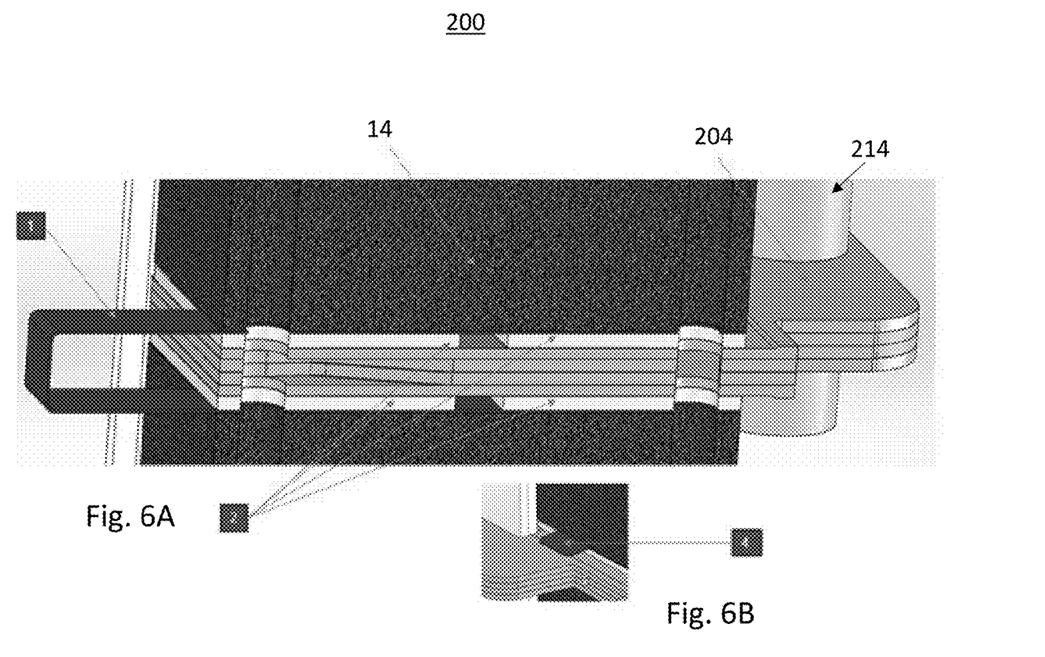
FIG. 6A is a three dimensional close up of a portion of the fuel cell stack assembly with an electrically isolated fuel manifold illustrated in FIG. 4.
FIG. 6B is a three dimensional close up of another portion of the fuel cell stack assembly with an electrically isolated fuel manifold illustrated in FIG. 4.

A three dimensional view of a fuel cell stack assembly 200 with an electrically isolated fuel manifold according to an embodiment of the present disclosure is illustrated in FIG. 4. FIG. 5 is an exploded view of the fuel cell stack assembly 200 illustrated in FIG. 4. FIG. 6A illustrates a close up of a portion of the fuel cell stack assembly 200 with an electrically isolated fuel manifold illustrated in FIG. 4. FIG. 6B illustrates a close up of another portion of the fuel cell stack assembly 200 with an electrically isolated fuel manifold 204 illustrated in FIG. 4.

In this embodiment, rather than braze ceramic and metal tubes the full length of the fuel rails 214 to provide electrical isolation between pairs of adjacent fuel cell stacks 14 separated by a fuel manifold 204, a dielectric material 2 is provided between the fuel manifolds 204 and the adjacent fuel cell stacks 14. The dielectric material 2 may comprise any suitable electrically insulating material, such as alumina, a ceramic matrix composite, etc. In an embodiment, the dielectric material 2 may be a single sheet or plate or multiple sheets or plates. In an alternative embodiment, discussed in more detail below, the dielectric material 2 may be a layer coated on top and bottom surfaces of the electrically conductive (e.g. metal) fuel manifold 204 which face adjacent stacks 14. In this embodiment, the fuel rails 214 may be made entirely of metal, not requiring dielectric (e.g., ceramic) tubes 216 which may be omitted. In one embodiment, the fuel rails 214 comprise only the metal bellows 218 and straight metal tubes 219.

In an embodiment, a jumper 1 is provided to allow current to flow from a first fuel cell stack 14 to an adjacent second fuel cell stack 14 which is spaced from the first stack 14 by the fuel manifold 204 in a fuel cell stack column 140 without current flowing though the fuel manifold 204. The jumper 1 may be placed in electrical contact with the first and second the fuel cell stacks 14 around the fuel manifold 204 and dielectric material 2. The jumper 1 can be made of any suitable conductor, e.g., metals or metal alloys such as Inconel 718 (or other Inconel alloys) or Cr—Fe 5 wt. % alloy, and may have a coefficient of thermal expansion close to that (e.g., substantially the same, such as within 20%, for example within 5%) of the stacks 14 and the dielectric material 2 to make sealing the various components easy. The jumper 1 may generally have a "C" shape in which the top and bottom portions electrically contact the respective adjacent first and second stacks 14 while the side of the jumper which connects the top and bottom portions goes around the fuel manifold 204 and does not contact the fuel manifold 204. In an embodiment, the inner surfaces of the jumper 1 facing the manifold 204 may be coated with a dielectric material 2 instead of or in addition to the sheets or plates of dielectric material 2 or the coating of dielectric material 2 on the surface of the fuel manifold 204.

As illustrated in FIG. 5, the dielectric material 2 is provided with fuel holes 8 which allow the fuel from the fuel manifolds 204 to flow to the fuel cell stacks 14. A seal may be formed around the fuel holes 8, such as a glass seal or any suitable gasket. In an embodiment, other features such as thermocouple slots 7 are provided in the dielectric material 2 to permit a thermocouple to pass through the slots 7. In an embodiment illustrated in FIG. 6B, tabs 4 which may be used to attach module voltage wires are provided in the jumper 1.

Figure 7:
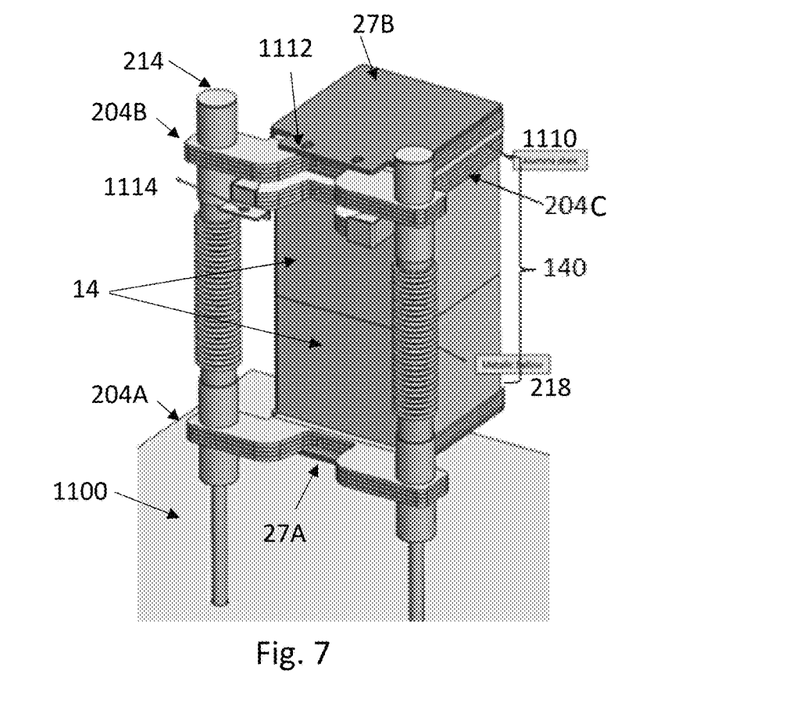
FIG. 7 is a three dimensional view of a fuel cell stack column in a test stand according to an embodiment.
Figure 8:
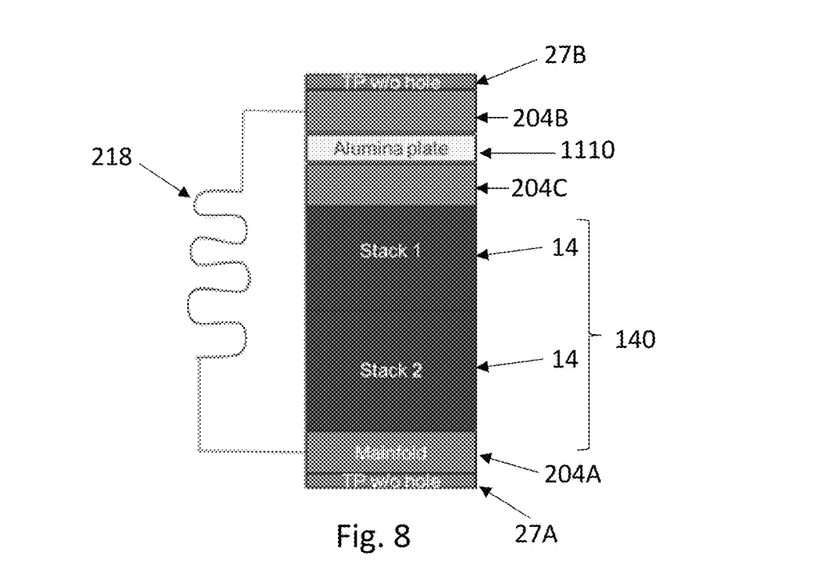
FIG. 8 is a schematic cross section of a fuel cell stack column/test stand configuration according to an embodiment.

FIGS. 7 and 8 illustrate a fuel cell stack column 140 under test (e.g., electrical test which tests the voltage, current and/or electrical power output by the column 140) in a test stand 1100 according to an embodiment. As seen in the three dimensional view of FIG. 7 and the schematic illustration of FIG. 8, fuel is delivered to the stacks 14 of the fuel cell stack column 140 via the fuel rail 214 which comprises an all metal bellow tube 218.

The column 140 under test contains one or more fuel cell stacks 14 (e.g., two stacks) and three fuel manifolds 204A-C. A first fuel manifold 204A is located below the stacks 14, while the second fuel manifold 204B and the third fuel manifold 204C are located above the stacks 14. The third fuel manifold 204C is located between the second fuel manifold 204B and the stacks 14. The second and third fuel manifolds are electrically isolated from each other by a ceramic plate 1110 (e.g., which corresponds to the dielectric material 2 of the prior embodiment) which is provided between the second and third fuel manifolds 204B, 204C. The ceramic plate 1110 may be sealed to the second and third fuel manifolds 204B, 204C with respective seals. The dummy third fuel manifold 204C is optional and is provided to maintain stack contact in the same configuration as an in-service stack to stack setup shown in the prior figures.

The first fuel manifold 204A and the second fuel manifold 204B are directly fluidly connected to the fuel rails 214. The third fuel manifold 204C is a dummy manifold because it is not directly fluidly connected to the fuel rails 214. The all metal bellows 218 only directly fluidly connects a lower first fuel manifold 204A located at the bottom of the fuel cell stack column 140 with the upper second fuel manifold 204B located at the top of the fuel cell stack column 140.

A first termination plate 27A is located below the first fuel manifold 204A and a second termination plate 27B is located above and electrically contacts the second fuel manifold 204B. The second termination plate 27B contains a first (e.g., anode) current collector 1112 and the third fuel manifold 204C contains a second (e.g., cathode) current collector 1114. During the electrical testing, electrical leads may be connected to the respective current collectors 1112 and 1114 such that the current flows from the stacks 14 through the first fuel manifold 204A, the fuel rails 214 (i.e., through the metal tubes 218), the second fuel manifold 204B and the second termination plate 27B to the first current collector 1112, and from the stacks 14 through the third fuel manifold 204C to the second current collector 1114. The ceramic plate 1110 prevents electrical short circuits between the first and second current collectors 1112, 1114 through the metal bellows tube 218. Advantageously, a more robust and reliable test configuration is formed by eliminating the brazed metal bellows 218/ceramic tube 216 configuration shown in FIG. 1.

A method of testing the fuel cell device of any of the above embodiments includes flowing fuel through the fuel manifold to the first and second fuel cell stacks; and testing an electrical output of the first and second fuel cell stacks.

In the first embodiment of FIGS. 4 to 6B, the electrically conductive jumper bypassing the fuel manifold conducts electricity between the first and second fuel cell stacks during the testing. The dielectric material comprises a single plate, multiple plates, a coating on the fuel manifold, a coating on an inner portion of a jumper or a combination thereof. The dielectric material is located between the first fuel cell stack and the fuel manifold, and between the fuel manifold and the second fuel cell stack in the column of fuel cell stacks.

In the second embodiment of FIGS. 7 and 8, the dielectric material contacts both the fuel manifold and an adjacent fuel manifold.

In one embodiment, the testing method further comprises flowing the fuel through an electrically conductive fuel rail to the fuel manifold. The electrically conductive fuel rail does not contain a ceramic tube. the electrically conductive fuel rail comprises metal or metal alloy bellows tube connected to straight metal or metal alloy tubes.

Although the foregoing refers to particular preferred embodiments, it will be understood that the invention is not so limited. It will occur to those of ordinary skill in the art that various modifications may be made to the disclosed embodiments and that such modifications are intended to be within the scope of the invention. All of the publications, patent applications and patents cited herein are incorporated herein by reference in their entirety.

What is claimed is:

1. A fuel cell device comprising a fuel cell column comprising:
   vertically stacked first and second fuel cell stacks;
   a fuel manifold located between the first and second fuel cell stacks and configured to provide fuel to the first and second fuel cell stacks; and
   a dielectric material configured to physically separate and electrically isolate the first and second fuel cell stacks from the fuel manifold.

2. The fuel cell device of claim 1, further comprising an electrically conductive jumper bypassing the fuel manifold, the electrically conductive jumper configured to conduct electricity between the first and second fuel cell stacks.

3. The fuel cell device of claim 2, wherein the dielectric material comprises a single plate, multiple plates, a coating on the fuel manifold, a coating on an inner portion of the electrically conductive jumper or a combination thereof.

4. The fuel cell device of claim 3, wherein the dielectric material comprises:
   a first dielectric plate located between the first fuel cell stack and the fuel manifold; and
   a second dielectric plate located between the fuel manifold and the second fuel cell stack.

5. The fuel cell device of claim 2, wherein the dielectric material comprises one or more holes configured to allow fuel to flow from the fuel manifold to the first and second fuel cell stacks.

6. The fuel cell device of claim 5, further comprising a seal or gasket sealing the one or more holes.

7. The fuel cell device of claim 2, wherein the dielectric material comprises one or more thermocouple slots.

8. The fuel cell device of claim 2, wherein the jumper comprises a material having a coefficient of thermal expansion substantially the same as the first and the second fuel cell stacks.

9. The fuel cell device of claim 8, wherein the coefficient of thermal expansion of the jumper material is within 20% of the coefficient of thermal expansion of the first and second fuel cell stacks.

10. The fuel cell device of claim 1, further comprising electrically conductive fuel rails connecting the fuel manifold to an adjacent fuel manifold in the column of fuel cell stacks.

11. The fuel cell device of claim 10, wherein the electrically conductive fuel rails do not contain ceramic tubes.

12. The fuel cell device of claim 10, wherein the electrically conductive fuel rails comprise metal or metal alloy bellows tubes connected to straight metal or metal alloy tubes.

13. The fuel cell device of claim 4, wherein:
   the first dielectric plate is located over the first fuel cell stack;
   is fuel manifold is located over the first dielectric plate;
   the second dielectric plate is located over the fuel manifold;
   the second fuel cell stack is located over the second dielectric plate; and
   the electrically conductive jumper contacts the first fuel cell stack and the second fuel cell stack while bypassing the fuel manifold.

14. A fuel cell device comprising:
   at least one fuel cell column comprising first and second fuel cell stacks;
   a fuel manifold located between the first and second fuel cell stacks and configured to provide fuel to the first and second fuel cell stacks;
   a dielectric material located to electrically isolate the first and second fuel cell stacks from the fuel manifold, wherein the dielectric material comprises one or more holes configured to allow fuel to flow from the fuel manifold to the first and second fuel cell stacks;
   a seal or gasket sealing the one or more holes; and
   an electrically conductive jumper bypassing the fuel manifold, the electrically conductive jumper configured to conduct electricity between the first and second fuel cell stacks.

15. A fuel cell device comprising:
   at least one fuel cell column comprising first and second fuel cell stacks;
   a fuel manifold located between the first and second fuel cell stacks and configured to provide fuel to the first and second fuel cell stacks;
   a dielectric material located to electrically isolate the first and second fuel cell stacks from the fuel manifold, wherein the dielectric material comprises one or more thermocouple slots; and
   an electrically conductive jumper bypassing the fuel manifold, the electrically conductive jumper configured to conduct electricity between the first and second fuel cell stacks.

16. A fuel cell device comprising:
   at least one fuel cell column comprising first and second fuel cell stacks;
   a fuel manifold located between the first and second fuel cell stacks and configured to provide fuel to the first and second fuel cell stacks;
   a dielectric material located to electrically isolate the first and second fuel cell stacks from the fuel manifold; and
   electrically conductive fuel rails connecting the fuel manifold to an adjacent fuel manifold in the column of fuel cell stacks.

17. The fuel cell device of claim 16, wherein the electrically conductive fuel rails do not contain ceramic tubes.

18. The fuel cell device of claim 16, wherein the electrically conductive fuel rails comprise metal or metal alloy bellows tubes connected to straight metal or metal alloy tubes.

* * * * *